United States Patent
Lee et al.

(10) Patent No.: US 6,565,671 B1
(45) Date of Patent: May 20, 2003

(54) SURFACE-TREATED STEEL SHEET COATED WITH CHROMATE FILM FOR FUEL TANKS AND METHOD OF FABRICATING THE SAME

(75) Inventors: Jae-Ryung Lee, Pohang-shi (KR); Sam-Kyu Chang, Pohang-shi (KR); Sang-Geol Noh, Pohang-shi (KR); Soo-Hyoun Cho, Pohang-shi (KR)

(73) Assignee: Pohang Iron & Steel Co., Ltd., Kyungsangbuck-do (KR)

( * ) Notice: Subject to any disclaimer, the term of this patent is extended or adjusted under 35 U.S.C. 154(b) by 0 days.

(21) Appl. No.: 09/889,809

(22) PCT Filed: Nov. 27, 2000

(86) PCT No.: PCT/KR00/01366

§ 371 (c)(1),
(2), (4) Date: Jul. 20, 2001

(87) PCT Pub. No.: WO01/38606

PCT Pub. Date: May 31, 2001

(30) Foreign Application Priority Data

Nov. 26, 1999 (KR) ......................................... 1999-52928

(51) Int. Cl.$^7$ ............................................... C23C 22/00
(52) U.S. Cl. ................. 148/251; 148/258; 148/259; 148/264; 148/267; 148/268; 106/14.12; 252/389.5; 252/389.3; 428/472; 428/472.3
(58) Field of Search .................... 148/251, 258, 148/259, 264, 267, 268; 106/14.12; 252/389.5, 389.3; 428/472, 472.3

(56) References Cited

U.S. PATENT DOCUMENTS

| | | | |
|---|---|---|---|
| 4,411,964 A | 10/1983 | Hara et al. ............. | 428/626 |
| 4,719,038 A | 1/1988 | Sobata et al. ............. | 252/511 |
| 5,242,572 A | 9/1993 | Shindou et al. ............. | 205/244 |
| 5,366,567 A | * 11/1994 | Ogino et al. ............. | 148/258 |
| 6,387,538 B1 | * 5/2002 | Lee et al. ............. | 148/258 |

FOREIGN PATENT DOCUMENTS

| | | |
|---|---|---|
| EP | 0285931 | 10/1988 |
| EP | 0385362 | 9/1990 |
| EP | 0479289 | 4/1992 |
| JP | 1072036 | 3/1998 |
| JP | 10137681 | 5/1998 |
| JP | 10193507 | 7/1998 |
| JP | 10235785 | 9/1998 |
| WO | 0032843 | 6/2000 |

* cited by examiner

*Primary Examiner*—John Sheehan
*Assistant Examiner*—Andrew L. Oltmans
(74) *Attorney, Agent, or Firm*—Baker Botts L.L.P.

(57) ABSTRACT

The present invention relates to a surface-treated steel sheet coated with a chromate layer having excellent corrosion resistance, fuel resistance and seam weldability, and a chromate solution used for preparing the surface-treated steel sheet. Specifically, the chromate solution of the present invention comprises (a) a main solution prepared by adding to a chrome solution having 0.4 to 0.8 of trivalent chrome composition and 7 to 50 g/l of dissolved chrome, on the basis of the chrome in the chrome solution, 50 to 80 w % of phosphate, 20 to 40 w % of fluoric acid, 300 to 2000 w % of colloidal silica, 5 to 15 w % of sulfuric acid, and 25 to 40 w % of sodium phosphate, and (b) a hardener solution containing added epoxy silane or glycidyl silane of 2 to 10 w % on the basis of total hardener solution, the pH of which is controlled between 2 and 3, wherein 10 to 60 w % of the hardener solution being added to the main solution.

7 Claims, No Drawings

SURFACE-TREATED STEEL SHEET COATED WITH CHROMATE FILM FOR FUEL TANKS AND METHOD OF FABRICATING THE SAME

BACKGROUND OF THE INVENTION (a) Field of the Invention

The present invention relates to an unleaded surface-treated steel sheet for fuel tanks of an automobile, more specifically, a surface-treated steel sheet coated with a chromate layer having excellent cosmetic corrosion resistance and fuel corrosion resistance as well as seam processibility and a method of fabricating the same.

(b) Description of the Related Art

Generally, it is required that fuel tanks for storing fuel of an automobile should have resistance to corrosion on its outer surface to be exposed to the atmosphere (hereinafter, referred to as the "cosmetic corrosion resistance") as well as resistance to corrosion on its inner surface to contact fuel such as gasoline (hereinafter, referred to as the "fuel corrosion resistance").

A fuel tank is usually made by press-forming steel sheets into cup-shaped upper and lower tank bodies, and welding the bodies to each other by resistance welding method such as spot welding or seam welding, or joining method such as soldering or brazing. In this respect, because two parts are joined each other in a fuel tank, good weldability and good processibility are required for the steel sheet to be applied for use in forming fuel tanks.

A ternesheet that is a cold-rolled steel sheet plated with lead-tin alloy has widely been used for fuel tanks. However, the ternesheet has been limited in its use because it contains lead that causes environmental pollution.

Korean Patent Application No. 97-703448 and Japanese Patent Laid Open Publication No. Hei9-59783 disclose unleaded surface-treated steel sheet that can replace ternesheet. The above inventions relate to coating special chromate solution on a zinc-nickel (Zn—Ni) alloy plated steel sheet. However, the above technique requires a minute crack-format on process on the zinc-nickel alloy plated layer before treating chromate, thus the manufacturing process is complicated. Furthermore, in such a structure, chrome is liable to elute even in contact with minimum amount of moisture contained in fuel, and this results in deteriorated fuel corrosion resistance.

To solve these problems, the present inventors provided chromate solution for a surface-treated steel sheet that does not need to form minute cracks on the plated layer and can prevent elution of chrome in the international patent publication No. WO 00/32843.

As an automobile company using surface-treated steel sheet for fuel tank tries to develop the appearance of an automobile variously, necessity of seam processing increases when manufacturing fuel tanks. When fuel tanks are manufactured by seam processing, a coating layer of surface-treated steel sheet which is subjected to seam-process forms cracks and peels off as well.

In addition, recent automobile companies have a tendency to replace electroplated steel sheet with melted zinc plated steel sheet in order to reduce cost and to increase cosmetic corrosion resistance of an automobile. Melted zinc plated steel sheet, however, is not appropriate to use as a fuel tank of automobile because it has problems such as cracking or exfoliation at the coating during seam processing even if it has good cosmetic corrosion resistance.

Thus, there is a need for developing chromate solution and a process for treating the same that satisfy cosmetic corrosion resistance and fuel corrosion resistance as well as seam processibility at the same time.

SUMMARY OF THE INVENTION

Therefore, the present invention is derived to solve the above problems. The present invention provides an unleaded surface-treated steel sheet coated with chromate which prevents cracks of coating layer during seam processing thereby improving cosmetic corrosion resistance and fuel corrosion resistance after processing.

It is another object of the present invention to provide chromate solution used for manufacturing surface-treated steel sheet coated with chromate which can improve cosmetic corrosion resistance and fuel corrosion resistance after processing.

It is another object of the present invention to provide chromate solution that adheres into melted zinc plated steel sheet and can prevent cracks or exfoliation due to abrasion between press plane during seam processing.

It is another object of the present invention to provide a process for fabricating unleaded surface-treated steel sheet coated with chromate layer which has excellent cosmetic corrosion resistance and fuel corrosion resistance after processing.

In order to achieve the above objects, the present invention provides a resin solution comprising: (a) a main solution prepared by adding 50 to 80 w % of phosphoric acid, 20 to 40 w % of fluoric acid, 300 to 2000 w % of colloidal silica, 5 to 15 w % of sulfuric acid, and 25 to 40 w % of sodium phosphate on the basis of chrome in a chrome solution having 0.4 to 0.8 of trivalent chrome rate and 7 to 50 g/l of dissolved chrome; and (b) a hardener aqueous solution comprising one of epoxy silane or glycidyl silane of 2 to 10 w % on the basis of total hardener solution, the pH of which being controlled between 2 and 3, said hardener aqueous solution of 10 to 60 w % being added to the main solution. Wherein, pH of said hardener aqueous solution is controlled by phosphoric acid.

In order to achieve the above objects, the present invention provides a method of fabricating surface-treated steel sheet for a fuel tank of an automobile comprising the steps of: plating zinc/zinc-based alloy on surface of low carbon content steel; coating the chromate solution of claim 1 on steel sheet plated with zinc/zinc-based alloy so as to have 30–150 mg/m$^2$ of chrome content of coating layer after drying; and baking said steel sheet coated with chromate solution at 140–250° C. Wherein, said plating step comprises soaking zinc/zinc-based alloy into steel sheet in electroplated or melted state.

In order to achieve the above objects, the present invention provides an unleaded surface-treated steel sheet coated with chromate solution.

According to the present invention, it is possible to provide an unleaded surface-treated steel sheet coated with chromate solution which compactly adheres melted zinc plated layer or zinc/zinc-based alloy electric plated layer so that it can reinforce adhesion between steel sheet and coating layer while seam processing, and improve cosmetic corrosion resistance and fuel corrosion resistance even after processing.

DETAILED DESCRIPTION OF THE PREFERRED EMBODIMENTS

An unleaded surface-treated steel sheet according to the present invention is prepared by electroplated zinc or zinc-nickel alloy, or plating melted zinc on cold-rolled steel sheet and coating chromate solution on the above steel sheet plated with eletroplating or melted zinc plating.

Low-carbon steel sheet having less than or equal to 0.03% of carbon content is used as a cold-rolled steel sheet in the present invention.

Hereinafter, chromate solution used for chromate layer coating is explained in detail.

Characteristics of chromate solution used in the present invention are as follows:

First, in order to maintain secure adhesion between coated chromate layer and zinc or zinc alloy layer, content of hardener solution added to the chromate solution is optimized. Thus, it can remarkably prevent destruction of chromate coating layer when processing surface-treated steel sheet coated with chromate layer. Accordingly, it is not necessary to form minute cracks on the surface of plated layer as prior art so that the process become simple and cost is reduced.

Second, excellent fuel corrosion resistance is obtained by drastically reducing elution of six-valent chrome while increasing hydrophobicity of chromate coating layer.

Third, since structure of chromate layer is improved by adding additives into chromate solution, the surface-treated steel sheet according to the present invention can maintain excellent cosmetic corrosion resistance and fuel corrosion resistance even after processing.

The chromate solution of the present invention comprises main solution and hardener solution.

The main solution comprises phosphoric acid, fluoric acid, colloidal silica, sulfuric acid and sodium phosphate as additives in addition to chrome aqueous solution, wherein sodium phosphate is added to improve structure of coating layer. Also, hardener solution comprises epoxy silane or glycidyl silane aqueous solution.

Chrome aqueous solution as a main component in the main solution is prepared as follows.

First, anhydrous chromic acid of 70–200 g/l is added into distilled water and is dissolved. Then, ethylene glycol is added to dissolved chromate and six-valent chrome is reduced to tri-valent chrome so that ratio of tri-valent chrome with respect to total chrome(reduction ratio) is 0.4–0.8. When reduction ratio is less than 0.4, it cannot obtain effect of cosmetic corrosion resistance by tri-valent chrome and content of elution chrome increases as soluble six-valent chrome increases. Meanwhile, when reduction ratio is more than 0.8, solution becomes gel so that storability of solution decreases.

Thus, concentration of chrome is set to 7–50 g/l by adding distilled water into chrome aqueous solution. The reason for limiting concentration of chrome relates to content of chrome added to a steel sheet. A roll coating process is used when chromate is coated on surface of plated steel sheet in the present invention. When the roll coating process is used, content of chrome adhering to steel sheet depends on rotation speed of a roll and pressure applied between rolls. Therefore, considering these characteristics, it needs to prepare solution which forms optimal coating layer. When content of chrome in chrome aqueous solution is less than 7 g/l, the amount of chrome adhering to steel sheet is deficient, whereas when more than 50 g/l, the appearance of the surface is not good and the stability of the solution decreases.

In order to improve material property of chromate solution prepared as above, phosphoric acid, fluoric acid, colloidal silica and sulfuric acid are added.

Content of phosphoric acid is preferably 50–80 wt % on the basis of chrome component. If phosphoric acid is less than 50 wt %, it is not sufficient to have improved effect of solution property and surface property. If phosphoric acid is more than 80 wt %, reduction ratio increases so that stability of solution decreases, and excess phosphate decreases cosmetic corrosion resistance.

Fluoric acid is added to improve cosmetic corrosion resistance and evenness of coating layer. If fluoric acid is added less than 20 wt % on the basis of chrome component, cosmetic corrosion resistance is not sufficient whereas if more than 40 wt %, sludge occurs in the solution so that stability of solution decreases. Therefore, content of fluoric acid is preferably 20–40 wt %.

Silicone oxide($SiO_2$) having pH 2–4 in the colloidal state as silica is added preferably in 300–2000 wt % on the basis of chrome component. Silica forms crosslink-bond during baking so that it prevents formation of zinc oxide at matrix metal. In addition, since silica is hydrophobic, it can increase cosmetic corrosion resistance against moisture and improve adhesion of coating layer. However, if silica is less than 300 wt %, the above effects are not sufficient whereas if silica is more than 2000 wt %, stability of solution and adhesion of coating decrease.

Sulfuric acid can improve surface quality of steel sheet by regulating color of solution. Also, it can improve stability of solution by improving flow of solution. If sulfuric acid is less than 5 wt % on the basis of chrome component, effect of material property of surface decreases whereas if more than 15 wt %, stability and cosmetic corrosion resistance of solution deteriorates.

The main solution of the present invention is prepared by adding the above element into chrome solution, further adding sodium phosphate as explained following, and mixing these.

The reason for addition of sodium phosphate is to improve material property of chromate coating layer. That is, sodium phosphate can prevent cracks of coating layer during seam processing so that it maintains cosmetic corrosion resistance and fuel corrosion resistance after processing. If sodium phosphate is less than 25wt %, effect of improving coating structure decreases. On the contrary, if sodium phosphate is more than 40 wt %, precipitation occurs in the solution so that stability of solution decreases. Therefore, content of sodium phosphate is preferably 25–40 wt %.

Chromate solution of the present invention is prepared by adding a hardener into the main solution prepared as above.

Hardener added to main solution facilitates cross link bond of chromate so that it forms chrome coating layer and simultaneously serves as maintaining adhesion of chromate coating layer and matrix metal. Thus, it is important to select hardener considering kind of zinc or zinc alloy plating which plated on steel sheet and the above effect. The hardener of the present invention includes epoxy silane and glycidyl silane considering the above.

First, a method of preparation for hardener solution comprising epoxy silane is as follows.

A hardener solution comprising epoxy silane is prepared by adding 2–10 wt % of epoxy silane into distilled water and adding small amount of phosphoric acid to prevent gelation when mixing with main solution. Thus, pH of hardener solution is set to be similar to that of main solution, which is 2–3. There are many method to set pH. Among those, it is preferable to add phosphoric acid. If epoxy silane is added less than 2 wt %, chrome cross-link reaction rarely occurs.

If epoxy silane is added more than 10 wt %, storability of solution decreases.

If hardener solution comprising epoxy silane is added less than 10 wt % on the basis of main solution, cross-link reaction does not occur sufficiently. If hardener solution comprising epoxy silane is added more than 50 wt %, stability of solution decreases. Thus, content of hardener solution comprising epoxy silane is preferably 10–50 wt % on the basis of main solution.

Then, a method of preparation for hardener solution comprising glycidyl silane is as follows.

A hardener solution comprising glycidyl silane is prepared by adding 2–10 wt % of glycidyl silane into distilled water and adding small amount of phosphoric acid to prevent gelation when mixing with main solution. Thus, pH of hardener solution is set to be similar to that of main solution, which is 2–3. If glycidyl silane is added less than 2 wt %, content of hardener needed to form chromate cross-link bond increases and total content of chrome decreases so that amount of chrome added to steel sheet decreases during chrome coating. If glycidyl silane is added more than 10 wt %, storability of solution decreases so that precipitation occurs in the solution.

If hardener solution comprising glycidyl silane is added less than 20 wt % on the basis of main solution, cross-link reaction of chromate does not occur at an appropriate temperature and time. Thus, chromates become macromolecule and do not form coating layer. And then, while heating and cooling it, most of chrome elutes so that cosmetic corrosion resistance dramatically decreases. If hardener solution comprising glycidyl silane is added more than 60 wt %, hardener component of chromate solution is subjected to occur chromate reduction so that stability of solution decreases. Therefore, it is preferable to add 20–60 wt % of hardener solution comprising glycidyl silane on the basis of main solution.

Particularly, glycidyl silane added to hardener solution reinforces adhesion of plated layer and chromate coating layer while treating melted zinc plated steel sheet with chromate. This is because glycidyl silane increases reactivity with melted zinc plated layer, which prevents exfoliation of coating layer or elution of surface by penetration of solvent.

Chromate solution prepared as above can be used as steel sheet for fuel tank by coating chromate on zinc-based alloy electroplated steel sheet or melted zinc plated steel sheet. In addition, resin may be coated on the upper side of the chromate coating layer for a fuel tank.

Since zinc plated steel sheet of the present invention includes zinc-based alloy plated steel sheet such as Zn or Zn—Ni, the present invention is not limited to zinc-based alloy exemplified in the specification.

Method of formation of chromate coating layer includes a reactive type, an electrolyte type, and a coating type. A reactive type and an electrolyte type, however, occur water pollution because they make six-valent chrome elution easily. Thus, a coating type is preferable in terms of cosmetic corrosion resistance and minimization of pollution.

Three-stage roll coater can be used for coating chromate solution on zinc/zinc-based alloy plated steel sheet. The amount of chromate attached to the steel sheet is regulated by each roll driving direction, rolling speed, and each roll adhesion pressure.

The amount of chromate is preferably 30–150 mg/m$^2$ on the basis of dried coating content on the plated steel sheet. If the content is less than 30 mg/m$^2$, cosmetic corrosion resistance is not sufficient whereas If the content is more than 150 mg/m$^2$, it is not economical and chrome elutes to deteriorate characteristics of coating layer.

Baking temperature of the steel sheet coated with chromate is preferably 140–250° C. If baking temperature is less than 140° C., hardening reaction of coating layer is not sufficient. On the contrary, if the baking temperature is more than 250° C., minute cracks occur on the surface so that cosmetic corrosion resistance decreases.

Now, preferred embodiments are suggested to help the apparent understanding of the present invention. The below embodiments are provided for the sake of clear understanding only and the present invention is not limited thereto.

EMBODIMENT

Example 1

Examples of chromate solution are prepared according to the method of the present invention in the composition of table 1.

TABLE 1

| Ex. Nos. | Chrome concentration (reduction ratio 0.5) (g/l) | Phosphoric acid (wt %) | Sulfuric acid (wt %) | Fluoric acid (wt %) | Sodium phosphate (wt %) | Colloidal silica (wt %) | Epoxy hardener (wt %) |
|---|---|---|---|---|---|---|---|
| Com. Ex. 1 | 24 | 60 | — | 25 | — | 800 | 30 |
| Com. Ex. 2 |  | 60 | 6 | 25 | — | 800 | 30 |
| Com. Ex. 3 |  | — | 6 | 25 | — | 800 | 30 |
| Com. Ex. 4 |  | 60 | 6 | 25 | — | — | 30 |
| Com. Ex. 5 |  | 60 | 6 | — | — | 800 | 30 |
| Com. Ex. 6 |  | 60 | 6 | 25 | — | 800 | — |
| Ex. 1 | 10 | 60 | 6 | 25 | 35 | 800 | 30 |
| Ex. 2 |  | 80 | 11 | 30 | 40 | 1300 | 20 |
| Ex. 3 |  | 60 | 8 | 40 | 30 | 1000 | 50 |
| Ex. 4 | 24 | 50 | 13 | 35 | 33 | 1500 | 40 |
| Ex. 5 |  | 70 | 10 | 30 | 27 | 1800 | 30 |

Comparative Example 2 of table 1 is the same composition as the chromate solution used in International patent publication No. WO 00/32843 filed by the present inventors. Epoxy silane as a hardener was a product(KBM303) made by Japanese Shinetsu Kagaku company.

Chromate solution prepared as above was coated on zinc or zinc-nickel alloy electroplated steel sheet by using a three-stage roll coater. The plating content of zinc or zinc-nickel alloy plated on steel sheet was shown in table 2. Chrome content of chromate layer coated on electric plated steel sheet was 50–150 mg/m² on the basis of dried coating after drying.

The plated steel sheet coated with chromate solution was baked at 140–250° C.

Cosmetic corrosion resistance and fuel corrosion resistance of the surface-treated steel sheet prepared by the above process were measured as follows.

Cosmetic corrosion resistance was measured by using a Salt Spray Test according to the Japanese Industrial Standard Testing (JIS Z 2371). A tester used in the salt spray test sprinkle 5% NaCl solution to the surface of specimen by 1 kg/m² of pressure and 1 ml/hour at 35° C. Cosmetic corrosion resistance was separately measured on flat plane of steel sheet and processed part. A specimen cut in a size of 75×150 mm as a flat plane was placed in the salt spray tester and measured. Then, a specimen was punched into 95 mmϕ and formed into a cup with diameter of 50 mm and height of 25 mm as a processed part. Cosmetic corrosion resistance was measured in an outer part. After passing determined time, the specimen was taken out from tester, washed with distilled water and dried. According to the amount of occurrence of rust, the grades of cosmetic corrosion resistance were classified.

Another method to measure cosmetic corrosion resistance is a Cyclic Corrosion Test. The cyclic corrosion test comprises spraying NaCl solution for 4 hours, drying at 60° C. for 4 hours and moisturizing at 95% humidity and 50° C. for 18 hours. The above cycle is one cycle/1 day. Cosmetic corrosion resistance was measured as follows and shown in table 2.

A flat plane facing to fuel was cut into 95 mmϕ, and formed to a cup with diameter of 50 mm and height of 25 mm. Fuel comprising regular gasoline 30 ml and 5% of sodium chloride (NaCl) aqueous solution was filled in the cup and fuel corrosion resistance was measured.

In order to simulate driving situation of automobile, rocking equipment was used such that the solution contained in the cup was in rocking motion. The cups were allowed to stand for 3 months. Then, the cups were taken out, washed by distilled water, and dried. According to the amount of occurrence of rust, the grades of fuel corrosion resistance were classified as the same way as the cosmetic corrosion resistance and shown in table 2.

TABLE 2

| | | cosmetic corrosion resistance | | | | fuel corrosion resistance 3 months |
|---|---|---|---|---|---|---|
| | | SST (720 hr) | | CCT (30 cycles) | | |
| Ex. Nos. | Content of chromate treating | flat plane | processing | flat plane | processing | |
| Com. Ex. A. | melted Pb—Sn alloy plated steel sheet (105 g/m²) | Δ | ⊚ | X | X | ○ |
| Com. Ex. B | Zn—Ni alloy electroplating (20 g/m²) + Com. Ex. 2 (80 mg/m²) | ⊚ | ⊚ | ⊚ | ○ | ⊚ |
| Ex. A-1 | Zn—Ni alloy electroplating (20 g/m²) + Ex. 1 (80 mg/m²) | ⊚ | ⊚ | ⊚ | ⊚ | ⊚ |
| Ex. A-2 | Pure Zn electroplating (40 g/m²) + Ex. 1 (50 mg/m²) | ○ | ⊚ | ○ | ⊚ | ⊚ |
| Ex. B | Zn—Ni alloy electroplating (20 g/m²) + Ex. 2 (50 mg/m²) | ⊚ | ⊚ | ⊚ | ⊚ | ⊚ |
| Ex. C | Zn—Ni alloy electroplating (20 g/m²) + Ex. 3 (130 mg/m²) | ⊚ | ⊚ | ⊚ | ⊚ | ⊚ |
| Ex. D | Zn—Ni alloy electroplating (20 g/m²) + Ex. 4 (80 mg/m²) | ⊚ | ⊚ | ⊚ | ⊚ | ⊚ |
| Ex. E | Zn—Ni alloy electroplating (20 g/m²) + Ex. 5 (100 mg/m²) | ⊚ | ⊚ | ⊚ | ⊚ | ⊚ |
| Ex. A-3 | Zn—Ni alloy electroplating (20 g/m²) + Ex. 1 (130 mg/m²) | ⊚ | ⊚ | ⊚ | ⊚ | ⊚ |
| Ex. A-4 | Zn—Ni alloy electroplating (20 g/m²) + Ex. 1 (100 mg/m²) | ⊚ | ⊚ | ⊚ | ⊚ | ⊚ |
| Com. Ex. C | Pure Zinc (40 g/m²) + special chromate (30–50 mg/m²) | X | X | X | X | Δ |
| Com. Ex. D | Zn—Ni alloy electroplating (20 g/m²) + special | ○ | ⊚ | ⊚ | ○ | X |
| Com. Ex. E. | Zn—Ni alloy electroplating (20 g/m²) | X | X | X | X | X |
| Com. Ex. F | Zinc plated steel sheet (20 g/m²) + Com. Ex. 1 (10 mg/m²) | X | X | X | X | X |
| Com. Ex. G | Melted zinc plating (90 g/m²) + Com. Ex. 2 (80 mg/m²) | ⊚ | X | ⊚ | X | X |

⊚: excellent, ○: good, Δ: fair, X: poor

As can be seen in table 2, cosmetic corrosion resistance and fuel corrosion resistance of Examples A–E are superior to Comparison Example A, C–G. Particularly, cosmetic corrosion resistance after processing of Example A to E coated with solution according to the present invention is superior to that of coated with comparison Example 2. Special chromate solution of table 2 used a solution comprising chrome aqueous solution with concentration of chrome of 30 g/l and reduction ratio of 0.8, phosphoric acid 10 wt %, cobalt 5%, and colloidal silica 50 wt %.

In addition, table 1 shows that Examples A-1 to A-4 coated with Example 1 of the present invention were superior to Comparison Examples in terms of cosmetic corrosion resistance and fuel corrosion resistance. Also, Example A-2 coated on pure zinc electroplated steel sheet was superior to Comparison Examples in terms of cosmetic corrosion resistance and fuel corrosion resistance.

Example 2

Examples of chromate solution were prepared according to the method of the present invention in the composition of table 3.

TABLE 3

| Ex. Nos. | Chrome Concentration (reduction ratio 0.5) (g/l) | Phosphoric acid (wt %) | Sulfuric acid (wt %) | Fluoric acid (wt %) | Sodium phosphate (wt %) | Colloidal silica (wt %) | hardener (wt %) Epoxy silane | hardener (wt %) Glycidyl silane |
|---|---|---|---|---|---|---|---|---|
| Com. Ex. 7 | 24 | 60 | 6 | 25 | — | 800 | 30 | |
| Com. Ex. 8 | | 60 | — | 25 | — | 800 | 30 | |
| Com. Ex. 9 | | — | 6 | 25 | — | 800 | 30 | |
| Com. Ex. 10 | | 60 | 6 | −5 | — | 800 | 30 | |
| Com. Ex. 11 | | 60 | 6 | — | — | — | 30 | |
| Com. Ex. 12 | | 60 | 6 | 25 | — | 800 | | |
| Ex. 6 | | 60 | 6 | 25 | 35 | 800 | | 30 |
| Ex. 7 | 10 | 80 | 11 | 30 | 40 | 1300 | | 20 |
| Ex. 8 | 24 | 60 | 8 | 40 | 30 | 1000 | | 50 |
| Ex. 9 | | 50 | 13 | 35 | 33 | 1500 | | 40 |
| Ex. 10 | | 70 | 10 | 30 | 27 | 1800 | | 30 |
| Ex. 11 | 30 | 70 | 8 | 25 | 35 | 1000 | | 40 |
| Ex. 12 | 45 | 60 | 6 | 35 | 35 | 800 | | 30 |

Comparison Example 7 of table 3 was the same as Comparison Example 2 of table 1. Glycidyl silane as a hardener was a product(KBM403) made by Japanese Shinetsu Kagaku company. In addition, a process of manufacturing plated steel sheet used in the present invention was the same as Example 1 except that melted zinc is plated on steel sheet.

Measurement of cosmetic corrosion resistance and fuel corrosion resistance was the same as Example 1 and table 4 showed the results.

TABLE 4

| Ex. Nos. | Content of chromate treating | Cosmetic corrosion resistance SST (720 hr) Flat plane | Cosmetic corrosion resistance SST (720 hr) processing | Cosmetic corrosion resistance CCT (30 cycles) Flat plane | Cosmetic corrosion resistance CCT (30 cycles) processing | Fuel corrosion resistance 3 months |
|---|---|---|---|---|---|---|
| Com. Ex. H | melted Pb—Sn alloy plated steel sheet (105 g/m²) | Δ | ⊙ | x | x | 0 |
| Com. Ex. I-1 | Melted Zn plating (90 g/m²) + Com. Ex. 7 (80 mg/m²) | ⊙ | x | ⊙ | x | x |
| Com. Ex. I-2 | Melted Zn plating (90 g/m²) + Com. Ex. 8 (80 mg/m²) | ⊙ | x | ⊙ | x | x |
| Com. Ex. I-3 | Melted Zn plating (90 g/m²) + Com. Ex. 9 (80 mg/m²) | ⊙ | x | ⊙ | x | x |
| Com. Ex. I-4 | Melted Zn plating (90 g/m²) + Com. Ex. 10 (80 mg/m²) | ⊙ | x | ⊙ | x | x |
| Com. Ex. I-5 | Melted Zn plating (90 g/m²) + Com. Ex. 11 (80 mg/m²) | ⊙ | x | ⊙ | x | x |
| Com. Ex. I-6 | Melted Zn plating (90 g/m²) + Com. Ex. 12 (80 mg/m²) | ⊙ | x | ⊙ | x | x |
| Ex. F-1 | Melted Zn plating (90 g/m²) + Ex. 6 (80 mg/m²) | ⊙ | ⊙ | ⊙ | ⊙ | ⊙ |
| Ex. G | Melted Zn plating (90 g/m²) + Ex. 7 (50 mg/m²) | ⊙ | ⊙ | ⊙ | ⊙ | ⊙ |
| Ex. H | Melted Zn plating (90 g/m²) + Ex. 8 (130 mg/m²) | ⊙ | ⊙ | ⊙ | ⊙ | ⊙ |
| Ex. I | Melted Zn plating (90 g/m²) + Ex. 9 (80 mg/m²) | ⊙ | ⊙ | ⊙ | ⊙ | ⊙ |
| Ex. J | Melted Zn plating (90 g/m²) + Ex. 10 (100 mg/m²) | ⊙ | ⊙ | ⊙ | ⊙ | ⊙ |
| Ex. K | Melted Zn plating (90 g/m²) + Ex. 11 (130 mg/m²) | ⊙ | ⊙ | ⊙ | ⊙ | ⊙ |
| Ex. L | Melted Zn plating (90 g/m²) + Ex. 12 (100 mg/m²) | ⊙ | ⊙ | ⊙ | ⊙ | ⊙ |
| Ex. F-2 | Melted Zn plating (90 g/m²) + Ex. 7 (130 mg/m²) | ⊙ | ⊙ | ⊙ | ⊙ | ⊙ |

TABLE 4-continued

| Ex. Nos. | Content of chromate treating | Cosmetic corrosion resistance | | | | Fuel corrosion resistance 3 months |
|---|---|---|---|---|---|---|
| | | SST (720 hr) | | CCT (30 cycles) | | |
| | | Flat plane | processing | Flat plane | processing | |
| Ex. F-3 | Melted Zn plating (90 g/m$^2$) + Ex. 7 (100 mg/m$^2$) | ◎ | ◎ | ◎ | ◎ | ◎ |
| Com. Ex. J | Pure Zn (40 g/m$^2$) + special chromate (30–50 mg/m$^2$) | x | x | x | x | |
| Com. Ex. K | Zn—Ni alloy electric plating (20 g/m$^2$) + special chromate (80 mg/m$^2$) | 0 | ◎ | ◎ | 0 | x |
| Com. Ex. L | Zn—Ni alloy plating (20 g/m$^2$) | x | x | x | x | x |
| Com. Ex. M | Zn plated steel sheet (20 g/m$^2$) + Com. Ex. 7 (10 mg/m$^2$) | x | x | x | x | x |
| Com. Ex. N | Melted Zn plating (90 g/m$^2$) + Com. Ex. 7 (80 mg/m$^2$) | ◎ | x | ◎ | x | x |

◎: excellent, 0: good, Δ: fair, x: poor

As can be seen from table 4, Examples F to L were superior to Comparison Examples H to N in terms of cosmetic corrosion resistance and fuel corrosion resistance. Particularly, in Comparison Examples I-1 to I-6, epoxy silane was added as a hardener. As a result, adhesion between chromate layer and material was not sufficient so that exfoliation occurred and cosmetic corrosion resistance decreased. Also, since solvent was penetrated, fuel corrosion resistance decreased. However, chromate solution prepared by using a hardener according to the present invention showed more excellent characteristics. Special chromate solution of table 4 used a solution comprising chrome aqueous solution with concentration of chrome of 30 g/l and reduction ratio of 0.8, phosphoric acid 10 wt %, cobalt 5%, and colloidal silica 50 wt %.

If the Examples of the present invention compare with the Comparison Examples, the Examples of the present invention were measured as showing good cosmetic corrosion resistance because area of white rust occurrence is relatively small in the salt spray test and cyclic corrosion test. This is believed that good cosmetic corrosion resistance of melted zinc plated steel sheet is maintained even after seam processing due to chromate solution.

Particularly, melted zinc-plated steel sheet treated with chromate solution of the present invention has improved cosmetic corrosion resistance and fuel corrosion resistance after processing because it prevents exfoliation of coating when fuel tank is subjected to seam processing.

What is claimed is:

1. A chromate solution used for preparing a surface-treated steel sheet for a fuel tank of an automobile comprising (a) a main body solution and (b) a hardener aqueous solution in an amount ranging from 10 to 60% by weight of the main solution, wherein the main solution comprises:

a chrome aqueous solution where the concentration of the chrome is in the range of 7 to 50 g/l, and a ratio of trivalent chrome to the chrome content is in the range of 0.4 to 0.8;

phosphoric acid in an amount ranging from 50 to 80% by weight with respect to the chrome content;

fluoric acid in an amount ranging from 20 to 40% by weight with respect to the chrome content;

sulfuric acid in an amount of 5 to 15% by weight with respect to the chrome content;

colloidal silica in an amount ranging from 300 to 2000% by weight with respect to the chrome content; and sodium phosphate in an amount of 25 to 40% by weight with respect to the chrome content; and the hardener aqueous solution comprises epoxy-based silane or glycidyl silane in an amount ranging from 2 to 10% by weight with respect to the hardener aqueous solution and has a pH of 2 to 3.

2. The chromate solution for a fuel tank of an automobile of claim 1, wherein the pH of said hardener aqueous solution is controlled by phosphoric acid.

3. The chromate solution for a fuel tank of an automobile of claim 1, wherein the amount of hardener aqueous solution ranges from 10 to 50% by weight of the main solution when epoxy-based silane is used.

4. The chromate solution for a fuel tank of an automobile of claim 1, wherein the amount of hardener aqueous solution ranges from 20 to 60% by weight of the main solution when glycidyl silane is used.

5. A method of fabricating surface-treated steel sheet for a fuel tank of an automobile comprising the steps of:

plating zinc/zinc-based alloy on surface of low-carbon content steel;

coating the chromate solution of claim 1 on steel sheet plated with zinc/zinc-based alloy so as to have 30–150 mg/m$^2$ of chrome content of coating layer after drying; and baking said steel sheet coated with chromate solution at 140–250° C.

6. The method of claim 5, wherein said plating step is performed by electroplating the zinc/zinc-based alloy or plating melted zinc/zinc-based alloy on a steel sheet.

7. A surface-treated steel sheet prepared by the process of claim 5 or claim 6.

* * * * *